(12) United States Patent
Druant et al.

(10) Patent No.: US 11,976,697 B2
(45) Date of Patent: May 7, 2024

(54) SYSTEM AND METHOD FOR CONTROLLING A DISCONNECT CLUTCH FOR A VEHICLE DRIVELINE

(71) Applicant: Dana Belgium N.V., Bruges (BE)

(72) Inventors: Joachim Druant, Houthulst (BE); Thomas Vyncke, Deinze (BE)

(73) Assignee: DANA BELGIUM N.V., Bruges (BE)

( * ) Notice: Subject to any disclaimer, the term of this patent is extended or adjusted under 35 U.S.C. 154(b) by 152 days.

(21) Appl. No.: 17/337,204

(22) Filed: Jun. 2, 2021

(65) Prior Publication Data
US 2022/0389978 A1    Dec. 8, 2022

(51) Int. Cl.
| | | |
|---|---|---|
| H02P 3/00 | (2006.01) | |
| F16D 48/06 | (2006.01) | |
| H02P 6/00 | (2016.01) | |
| H02P 7/03 | (2016.01) | |

(52) U.S. Cl.
CPC .............. F16D 48/064 (2013.01); H02P 7/04 (2016.02); *H02P 2201/03* (2013.01)

(58) Field of Classification Search
CPC ....... F16D 48/064; H02P 7/04; H02P 2201/03
See application file for complete search history.

(56) References Cited

U.S. PATENT DOCUMENTS

| | | | |
|---|---|---|---|
| 9,302,589 B2 | 4/2016 | Schneider et al. | |
| 9,407,086 B2 | 8/2016 | Veil et al. | |
| 10,153,698 B1 | 12/2018 | Katrak | |
| 2009/0033253 A1* | 2/2009 | Nagashima | B60L 15/00 320/137 |
| 2016/0332534 A1* | 11/2016 | Kim | B60W 20/40 |
| 2018/0050686 A1* | 2/2018 | Atluri | B60K 6/387 |
| 2018/0244169 A1* | 8/2018 | Meyer | B60L 53/60 |
| 2020/0254865 A1* | 8/2020 | Stoltz | B60K 6/40 |
| 2020/0294745 A1* | 9/2020 | Leonard | B60R 16/03 |
| 2021/0372506 A1* | 12/2021 | Mcgrew, Jr. | F16H 3/66 |
| 2022/0118844 A1* | 4/2022 | Golder | B60K 17/28 |

FOREIGN PATENT DOCUMENTS

| | | |
|---|---|---|
| DE | 19917215 A1 | 10/2000 |
| DE | 102018207590 A1 | 11/2019 |

* cited by examiner

*Primary Examiner* — Erick D Glass
(74) *Attorney, Agent, or Firm* — McCoy Russell LLP

(57) ABSTRACT

Methods and systems for operating a driveline disconnect clutch actuator are provided. In one example, the driveline disconnect clutch actuator may be supplied with electric power to activate and deactivate a driveline disconnect clutch when electric power is available via a first power source. The driveline disconnect clutch actuator may be supplied with electric power to open the driveline disconnect clutch when output from the first driveline disconnect clutch is unavailable.

20 Claims, 6 Drawing Sheets

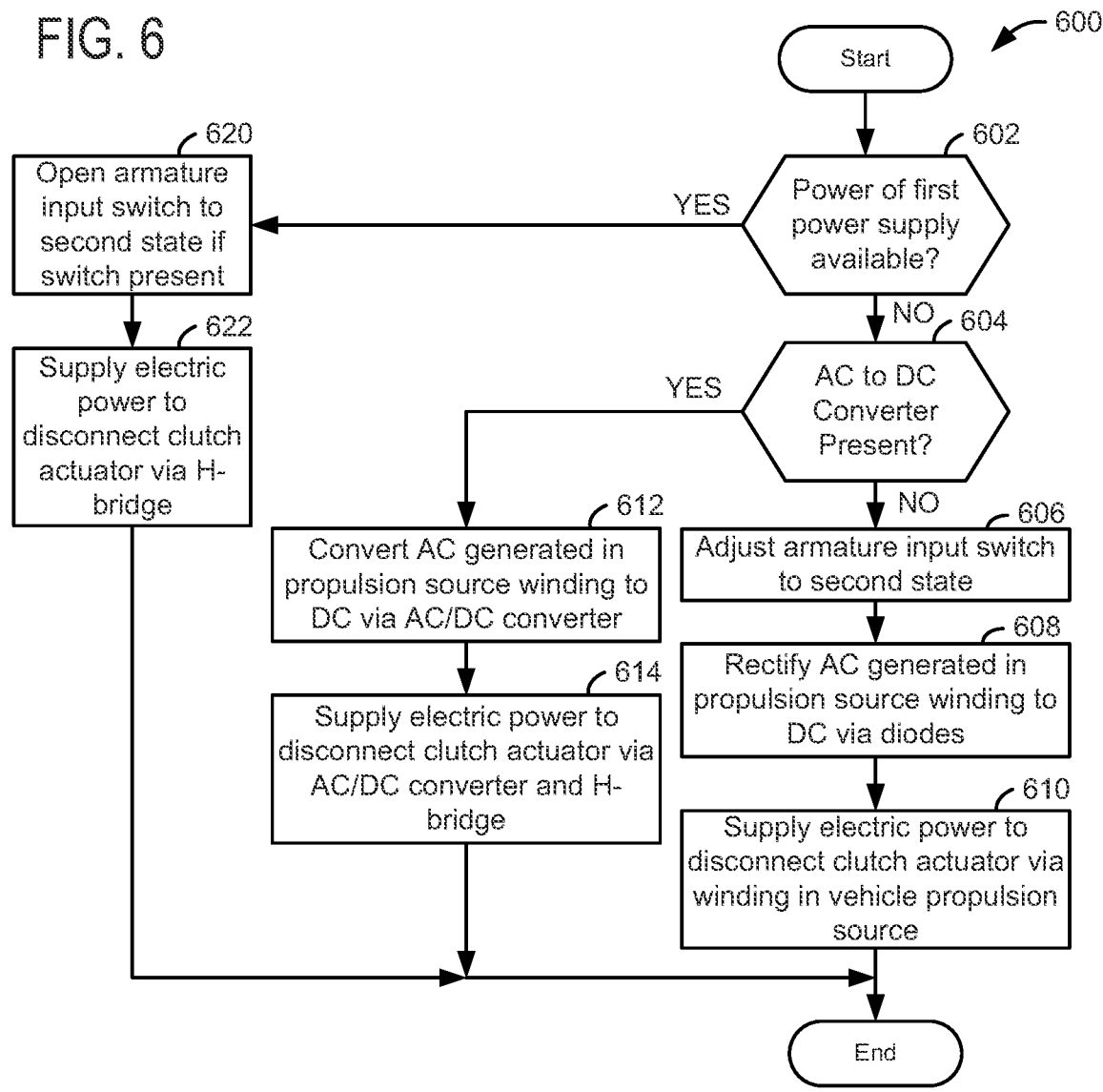

SYSTEM AND METHOD FOR CONTROLLING A DISCONNECT CLUTCH FOR A VEHICLE DRIVELINE

TECHNICAL FIELD

The present disclosure relates to a system and method for controlling an operating state of a driveline disconnect clutch. The driveline disconnect clutch may selectively couple and decouple an electric machine from a vehicle driveline.

BACKGROUND AND SUMMARY

A vehicle driveline may include an electric machine as a propulsion source. The electric machine may provide positive propulsive effort to propel a vehicle. The electric machine may also operate in a regeneration capacity so slow the vehicle and charge an electric energy storage device. The electric machine may be a vehicle's sole propulsion source or it may be paired with a second electric machine or an internal combustion engine. As such, there may be times when it may be desirable to decouple the electric machine from the vehicle's driveline so that electric energy may be conserved or so that a possibility of the electric machine degrading may be reduced. One way to decouple the electric machine from the vehicle may be to place a dog clutch between the electric machine and other vehicle driveline components. The dog clutch may be operated via a mono-stable actuator or a bi-stable actuator. The mono-stable actuator may be configured such that its default state is a state where the electric machine is decoupled from the driveline so that a possibility of electric machine degradation may be reduced. However, mono-stable actuators may consume electric power when they are in an operating state, thereby increasing electric power consumption. The bi-stable actuator may be configured such that it consumes electric power to transition between states, but once it is in a fully open or fully closed state, it stays open or closed and it may consume little, if any, electric power. Nevertheless, the bi-stable actuator may remain in a state once it enters the state. Therefore, it may not have a default state where it decouples the electric machine from the vehicle driveline to reduce a possibility of electric machine degradation.

The inventors herein have recognized the above-mentioned issues and have developed a method for operating a driveline disconnect clutch, comprising: supplying electric energy to a driveline disconnect clutch actuator via a first power source; and supplying electric energy to the driveline disconnect clutch actuator via a second power source, where the second power source is a winding of a traction motor.

By supplying electric energy to a driveline disconnect clutch actuator via a first power source and supplying electric energy to the driveline disconnect clutch actuator via a second power source, where the second power source is a winding of a traction motor, it may be possible to provide the technical result of operating a bi-stable actuator such that it includes an open default state. In other words, if electric power is not available from an electric energy source that may typically supply electric power to the driveline disconnect clutch actuator, electric power may be supplied from a second electric energy source. The second electric energy source may be a winding of a traction motor.

The present description may provide several advantages. In particular, the approach may allow a default state for a bi-stable actuator. In addition, the approach provides for two electric energy sources so that a possibility of reaching the default state may be improved. Further, the approach may be implemented in alternative ways to improve design flexibility.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 6 is a method for operating a driveline disconnect clutch actuator is shown.

DETAILED DESCRIPTION

Figure 2:
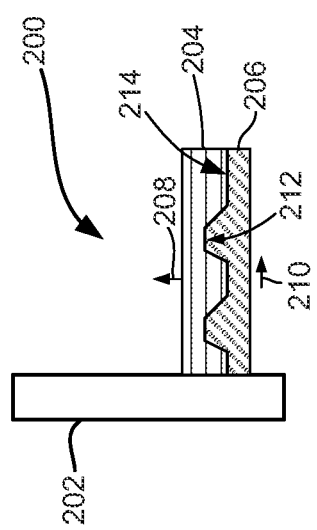
FIG. 2 is a schematic diagram of an example of a portion of mechanical components included in a driveline disconnect clutch actuator are shown.
Figure 3:
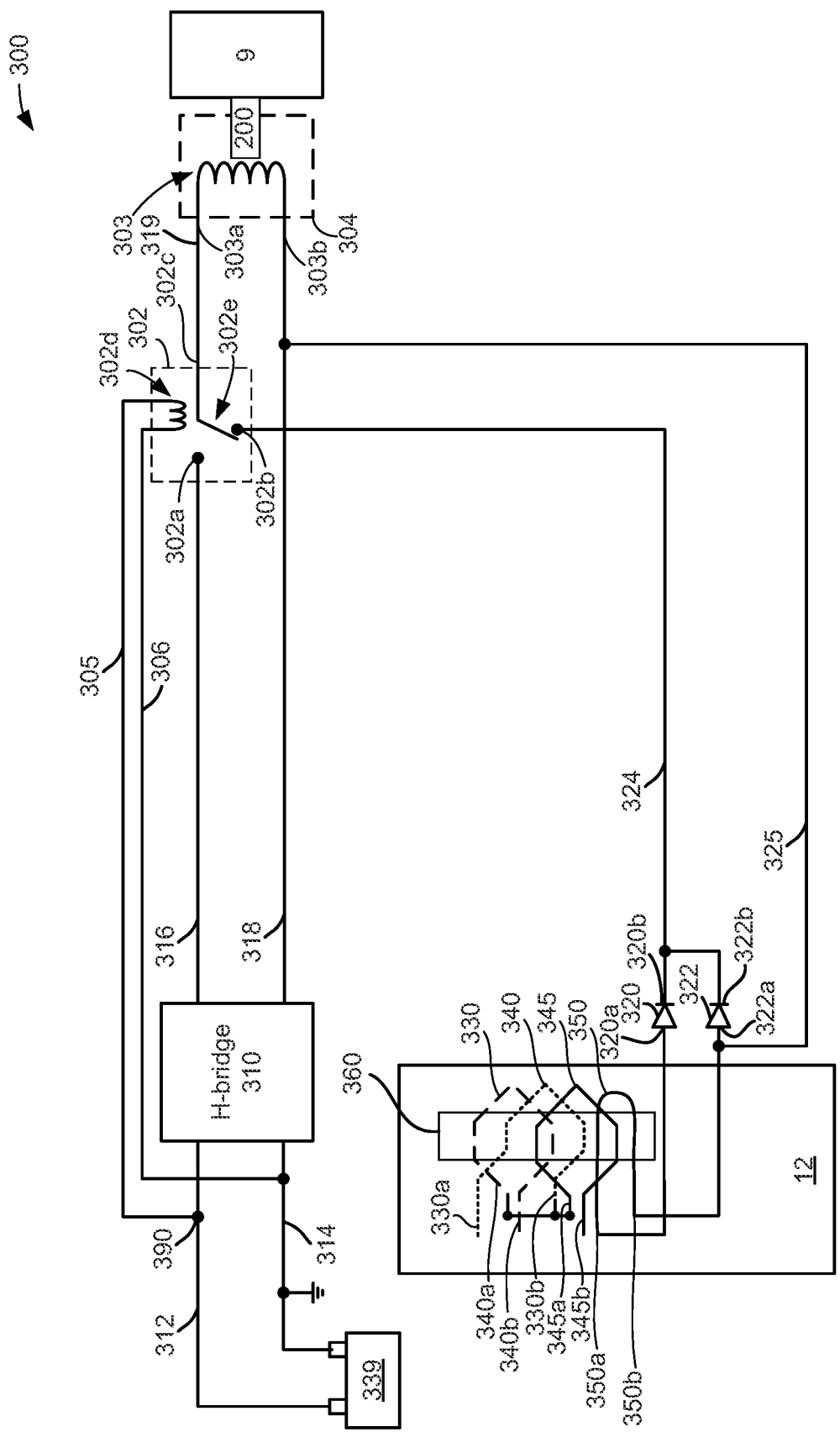
FIG. 3 is an electrical schematic of a first circuit for operating a driveline disconnect actuator is shown.
Figure 4:
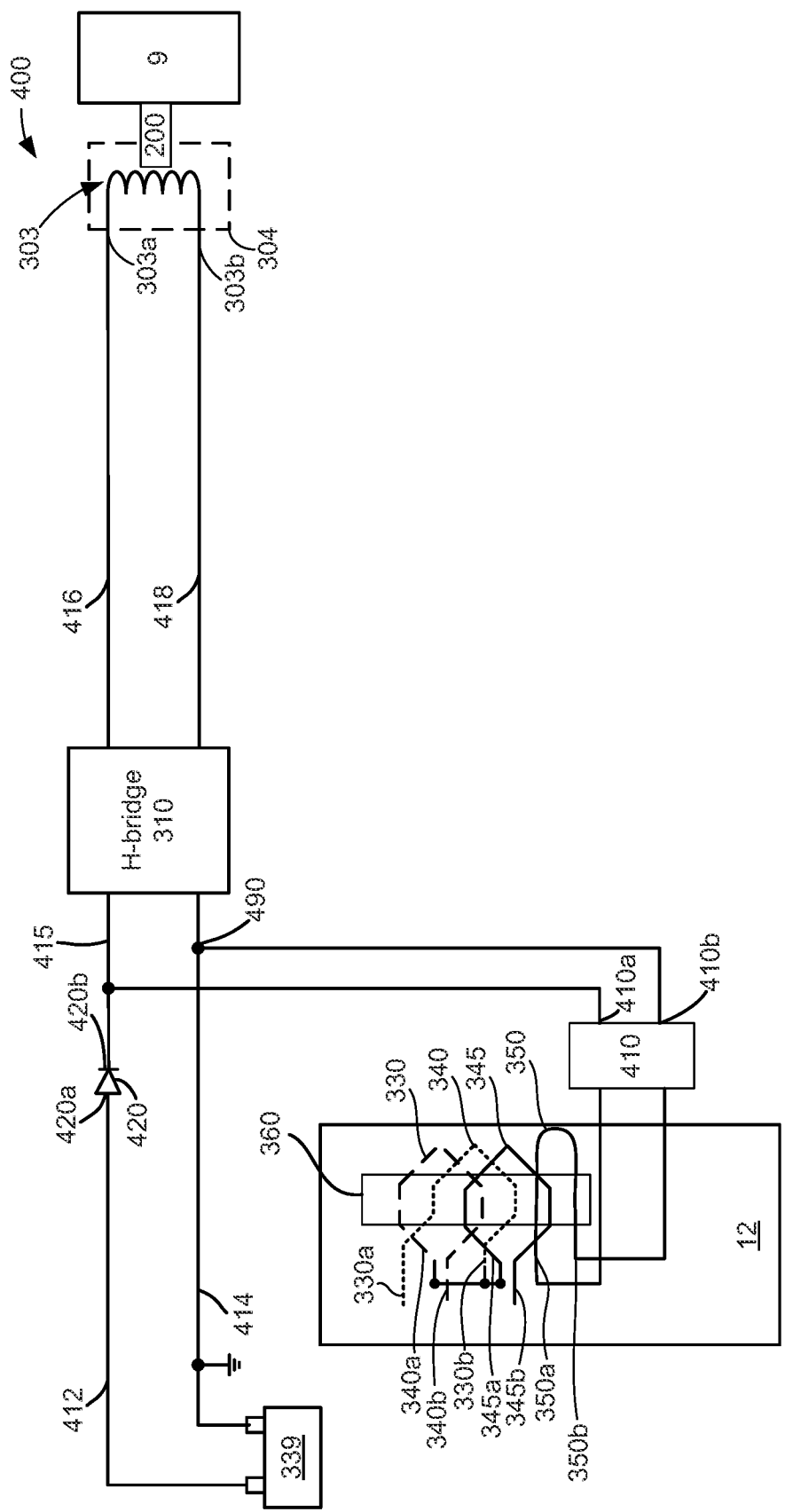
FIG. 4 is an electrical schematic of a second circuit for operating a driveline disconnect actuator is shown.

The following description relates to systems and methods for operating a driveline disconnect clutch actuator that operates a driveline disconnect clutch. The driveline disconnect clutch may be selectively opened and closed to couple and decouple an electric machine to components of a driveline. The driveline may be of the configuration shown in FIG. 1. Alternatively, the driveline may be of a different configuration that includes an electric machine. The driveline disconnect clutch actuator may operate the driveline disconnect clutch via mechanical components as shown in FIG. 2 or via alternative mechanical components. The driveline disconnect clutch actuator may be incorporated into a circuit as shown in FIG. 3. Alternatively, the driveline disconnect clutch actuator may be incorporated into a circuit as shown in FIG. 4. The driveline disconnect clutch actuator may be operated according to the sequence of FIG. 5 and the method of FIG. 6.

Figure 1:
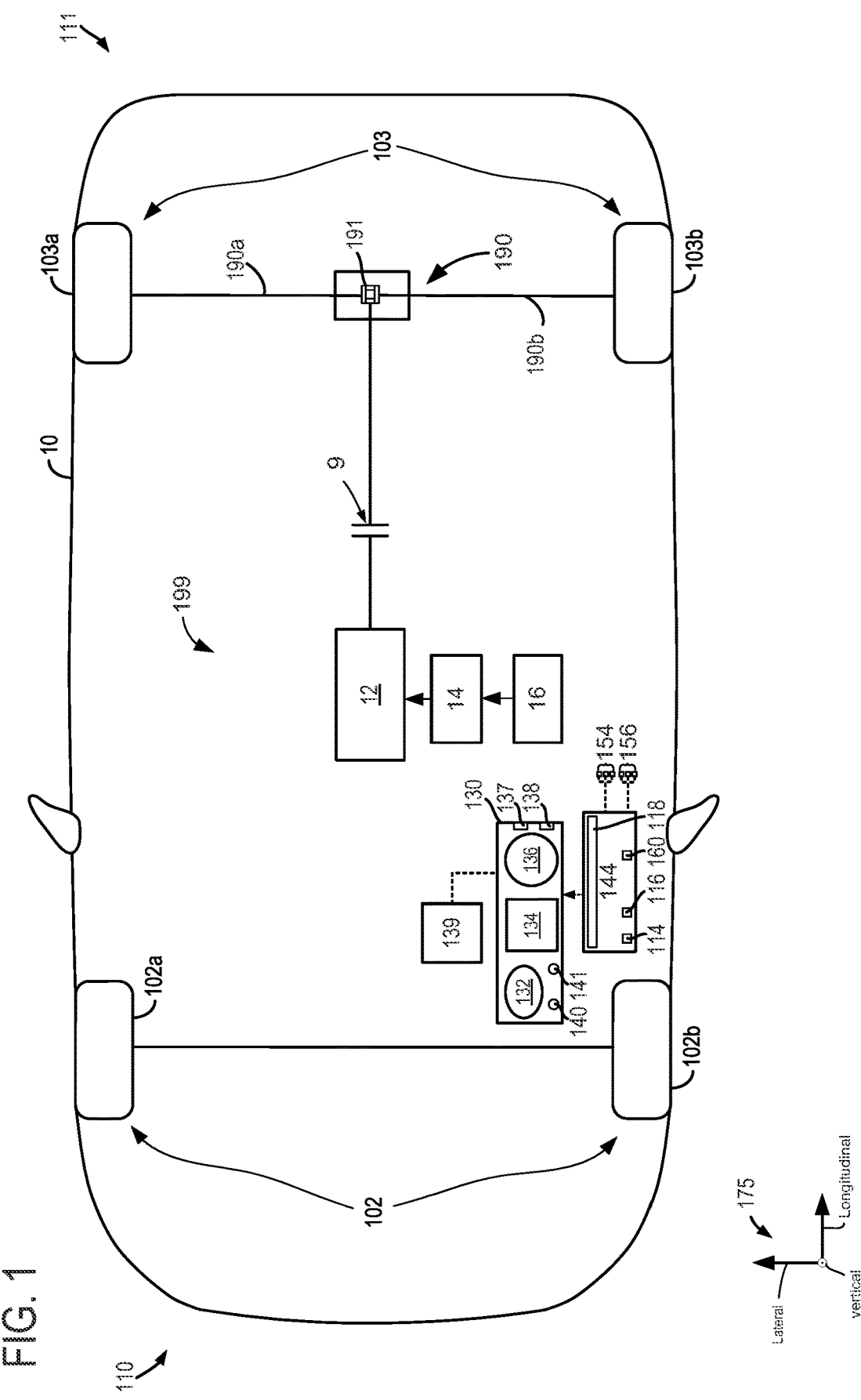
FIG. 1 is a schematic diagram of an example driveline assembly.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 that may selectively provide propulsive effort to rear axle 190. In other examples, the propulsion source may provide propulsive effort to front wheels 102. Propulsion source 12 may be an electric machine (e.g., a motor/generator). Propulsion source is shown mechanically coupled to driveline disconnect clutch 9. Driveline disconnect clutch 9 may be selectively opened to decouple propulsion source 12 from rear axle 190. Driveline disconnect clutch 9 may be selectively closed to couple propulsion source 12 to rear axle 190. In other examples, propulsion source 12 and driveline disconnect clutch 9 may be incorporated into rear axle 190. Electric energy storage device 16 (e.g., a traction battery or capacitor) may provide electric power to and receive electric power from propulsion source 12. Inverter 14 may convert direct current (DC) from electric energy storage device 16 to alternating current (AC). The AC may be supplied from inverter 14 to propulsion source 12. Alternatively, inverter 14 may convert AC from propulsion source 12 to DC that is supplied to electric energy storage device 16.

Rear axle 190 comprises two half shafts, including a first or right haft shaft 190a and a second or left half shaft 190b. The rear axle 190 may be an integrated axle that includes a differential gear set 191. Differential gear set 191 may be open when vehicle 10 is traveling on roads and negotiating curves so that right rear wheel 103a may rotate at a different speed than left rear wheel 103b.

Controller 144 may communicate with dash board 130, propulsion source 12, and rear axle 190. Controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to front axle differential locking mechanism sensor 124 and rear axle differential locking mechanism position sensor 194. Actuators 156 may include but are not limited to vehicle speed sensors, propulsion source speed sensors, voltage, and current sensors for sensing voltage and current of propulsion source 12.

Vehicle 10 may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 114 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 is indicated via axes 175.

Turning now to FIG. 2, an example of a portion of mechanical components included in a driveline disconnect clutch actuator are shown. Mechanical components 200 of the driveline disconnect clutch may include a first ramp mechanism 206 that may be moved directionally as indicated at 210 via an electrically operated portion (not shown) of the driveline disconnect clutch actuator. FIG. 2 shows first ramp mechanism 206 and second ramp mechanism 204 in a position where the driveline disconnect clutch is fully open (not shown), and the first ramp mechanism 206 and the second ramp mechanism 204 tend not to move in this position such that the driveline disconnect clutch actuator is in a stable position where its operating state tends not to change when electric power is removed from the driveline disconnect clutch actuator.

Moving the first ramp mechanism 206 in direction 210 causes the first ramp mechanism 206 to apply a force to second ramp mechanism 206, thereby caucusing second ramp mechanism to move as indicated at 208. The driveline disconnect clutch 9 in FIG. 1 is fully closed and in a stable state when power is removed from the electrical actuator of the driveline disconnect clutch actuator when flat portions of protrusions 212 are in contact with lower mating surface 214. The driveline disconnect clutch 9 may be fully opened by moving second ramp mechanism 206 into contact with backstop 202.

Referring now to FIG. 3, an electrical schematic of a first circuit 300 for operating a driveline disconnect clutch is shown. The first circuit is exemplary in nature and it should be appreciated that other known components may be substituted for one or more components shown in FIG. 3. A conductor may be coupled to another conductor, and the coupling may be indicated via a node as shown at 390.

Circuit 300 includes a first electric power source 339 (e.g., a low voltage battery that outputs less than 30 volts, such as a 12 volt battery) that may supply electric power to driveline disconnect clutch actuator input switch 302, H-bridge 310, and driveline disconnect clutch actuator 304 via first conductor 312 and second conductor 314. H-bridge may be configured with a plurality of transistors that allow driveline disconnect clutch actuator 304 to operate in a first direction or a second direction. Thus, H-bridge 310 may allow driveline disconnect clutch actuator to operate in a forward direction that closes the driveline disconnect clutch 9, or in a reverse direction that opens the driveline disconnect clutch 9. Driveline disconnect clutch actuator input switch 302 may be a single pole double through switch that may direct electric power from first electric power source 339 and H-bridge 310 via first input 302a and output 302c when electric power is applied to coil 302d (e.g., when electric power source 339 is available). The driveline disconnect clutch actuator input switch may be in a first position and first state when the first power source is available. Driveline disconnect clutch actuator input switch 302 may also direct electric power from winding 350 via second input 302b and output 302c when electric power is not applied to coil 302d. The driveline disconnect clutch actuator input switch may be in a second position and second state when the first power source is not available. A voltage and electric current may be applied to coil or winding 302d via conductors 305 and 306.

It should be appreciated that driveline disconnect clutch actuator input switch 302 may be a solid state device or a conventional relay or switch.

Driveline disconnect clutch actuator 304 may selectively open and close driveline disconnect clutch 9 when electric power is applied to coil or winding 303. Coil or winding 303 may provide a force to move mechanical components 200. For example, driveline disconnect clutch actuator 304 may fully open driveline disconnect clutch 9 when a voltage with a first polarity is applied to a first input 303a and a second input 303b of coil or winding 303 via conductors 319 and 318. Driveline disconnect clutch actuator 304 may fully close driveline disconnect clutch 9 when a voltage with a second polarity is applied to first input 303a and second input 303b of coil or winding 303 via conductors 319 and 318.

Propulsion source 12 may include a stator 360 a first winding 330, a second winding 340, and a third winding 345, and a fourth winding 350 that are wrapped around stator 360. First winding 330 includes a first lead 330a and a second lead 330b. Second winding 340 includes a first lead 340a and a second lead 340b. Third winding 345 includes a first lead 345a and a second lead 345b. In one example, first lead 330a of first winding 330 may be electrically coupled to first lead 340a of second winding 340, and first lead 345a of third winding 345 may be electrically coupled to first lead 330a of first winding 330 and first lead 340a of second winding 340. Fourth winding 350 is galvanically insulated from first winding 330, second winding 340, and third winding 345. Fourth winding 350 may include a fewer number of turns (e.g., one turn) around armature 360 as compared to first winding 330, second winding 340, and fourth winding 350. First lead 350a of fourth winding 350 may also be electrically coupled to anode 320a of first diode 320. Second lead 350b of fourth winding 350 may be electrically coupled to anode 322a of second diode 322. First diode 320 and second diode 322 are arranged in parallel. Cathode 320b of first diode and cathode 322b of second diode 322 are electrically coupled to second input 302b of switch 302 via conductor 324. Anode 322a of second diode 322 is electrically coupled to conductor 318 via conductor 325. Second lead 330b of first winding 330 may be electrically coupled to inverter 14 and to traction battery 16. Likewise, second lead 340b of second winding 340 may be electrically coupled to inverter 14 and to traction battery 16.

A magnetic field within propulsion source 12 may pass through fourth winding 350 so as to generate a voltage (e.g., 12 volts) at fourth winding 350. The voltage may be rectified via first diode 320 and second diode 322. DC voltage pulses may be applied to winding or coil 303 via driveline disconnect clutch actuator input switch 302. Polarity of the voltage that is output from fourth winding 350 may be applied to coil 303 such that coil 303 causes driveline disconnect clutch 9 to open so that torque from propulsion source 12 may not be delivered to the vehicle's wheels. Decoupling propulsion source 12 from the vehicle's wheels may reduce a possibility of operating the propulsion source 12 at speed that may be higher than may be desired.

During operating conditions when first electric power source 339 is available (e.g., activated such that it may supply electrical power), first electric power source 339 supplies electric power to H-bridge and coil or winding 302d of driveline disconnect clutch input switch 302. Driveline disconnect clutch input switch 302 allows electric energy to flow from H-bridge 310 to coil or winding 308 of driveline disconnect clutch actuator 304 when first electric power source 339 supplies electric power to coil or winding 302d.

Driveline disconnect clutch input switch 302 does not allow electric energy to flow from fourth winding 350 to coil or winding 303 of driveline disconnect clutch actuator 304 when first electric power source 339 supplies electric power to coil or winding 302d. Driveline disconnect clutch 9 may be fully opened or fully closed when first electric power source 339 is available.

During operating conditions when first electric power source 339 is unavailable (e.g., is not activated such that it may not supply electrical power), first electric power source 339 does not supply electric power to H-bridge and coil or winding 302d of driveline disconnect clutch input switch 302. Driveline disconnect clutch input switch 302 does not allow electric energy to flow from H-bridge 310 to coil or winding 308 of driveline disconnect clutch actuator 304 when first electric power source 339 does not supply electric power to coil or winding 302d. Driveline disconnect clutch input switch 302 allows electric energy to flow from fourth winding 350 to coil or winding 308 of driveline disconnect clutch actuator 304 when first electric power source 339 does not supply electric power to coil or winding 302d. AC generated via fourth winding 350 is rectified via first diode 320 and second diode 322 into DC pulses that are supplied to coil or winding 308 so that driveline disconnect clutch 9 may be fully opened.

Referring now to FIG. 4, an electrical schematic of a second circuit 400 for operating a driveline disconnect clutch 9 is shown. The second circuit is exemplary in nature and it should be appreciated that other known components may be substituted for one or more components shown in FIG. 4. A conductor may be coupled to another conductor, and the coupling may be indicated via a node as shown at 490.

Circuit 400 includes a first electric power source 339 (e.g., a low voltage battery that outputs less than 30 volts, such as a 12 volt battery) that may supply electric power to H-bridge 310 and driveline disconnect clutch actuator 304 via diode 420, first conductor 412, and second conductor 414. First electric power source 339 is directly coupled to anode 420a of diode 420 via first conductor 412. Cathode 420b is coupled to H-bridge via conduction 415. Diode 420 prevents electrical current flow to first electric power source 339 from AC to DC converter 12. H-bridge 310 may be configured with a plurality of transistors that allow driveline disconnect clutch actuator 304 to operate in a first direction or a second direction. Thus, H-bridge 310 may allow driveline disconnect clutch actuator 304 to operate in a forward direction that closes the driveline disconnect clutch 9, or in a reverse direction that opens the driveline disconnect clutch 9. A voltage and electric current may be applied to coil or winding 303 via conductors 416 and 418.

Driveline disconnect clutch actuator 304 may selectively open and close driveline disconnect clutch 9 when electric power is applied to coil or winding 303. Coil or winding 303 may provide a force to move mechanical components 200. Driveline disconnect clutch actuator 304 may operate as previously described.

Propulsion source 12 may include a stator 360 a first winding 330, a second winding 340, a third winding 345, and a fourth winding 350 that are wrapped around stator 360. First winding 330 includes a first lead 330a and a second lead 330b. Second winding 340 includes a first lead 340a and a second lead 340b. Third winding 345 includes a first lead 345a and a second lead 345b. In one example, first lead 330a of first winding 330 may be electrically coupled to first lead 340a of second winding 340, and first lead 345a of third winding 345 may be electrically coupled to first lead 330a of first winding 330 and first lead 340a of second winding 340. Fourth winding 350 may include a fewer number of turns (e.g., a single turn that outputs 12 volts) than first winding 330, second winding 340, and third winding 345. Fourth winding 350 may be galvanically insulated from first winding 330, second winding 340, and third winding 345. First lead 350a of fourth winding 350 may also be electrically coupled to a power electronic converter 410 (e.g., an AC to DC converter that rectifies and filters AC input to provide DC output). Second lead 350b of fourth winding 350 may also be electrically coupled to a power electronic converter 410. A first output of power electronic converter 410a may be coupled to conductor first input 310a of H-bridge 310 via conductor 413. A second output of power electronic converter 410b may be coupled to conductor second input 310b of H-bridge 310 via conductor 415.

A magnetic field within propulsion source 12 may pass through fourth winding 350 so as to generate a voltage at fourth winding 350. The voltage may be rectified via power electronic converter 410. A DC voltage may be applied to winding or coil 303 via power electronic converter 410. Polarity of the voltage that is output from fourth winding 350 may be applied to coil 303 such that coil 303 causes driveline disconnect clutch 9 to open so that torque from propulsion source 12 may not be delivered to the vehicle's wheels. Decoupling propulsion source 12 from the vehicle's wheels may reduce a possibility of operating the propulsion source 12 at speed that may be higher than may be desired.

During operating conditions when first electric power source 339 is available (e.g., activated such that it may supply electrical power), first electric power source 339 supplies electric power to H-bridge. Electric energy may flow from H-bridge 310 to coil or winding 303 of driveline disconnect clutch actuator 304. Driveline disconnect clutch may be fully opened or fully closed when first electric power source 339 is available.

During operating conditions when first electric power source 339 is unavailable (e.g., is not activated such that it may not supply electrical power), first electric power source 339 does not supply electric power to H-bridge. However, power electronic converter 410 supplies electric energy to H-bridge 310 when first electric power source 339 does not supply electric power to H-bridge 310. AC generated via fourth winding 350 is rectified via power electronic converter 410 and H-bridge 310 may supply electric power to coil or winding 303 such that driveline disconnect clutch 9 may be fully opened.

The systems of FIGS. 1-4 provide for a system for operating a driveline disconnect clutch, comprising: a first electric energy source in electric communication with a driveline disconnect clutch actuator; and a second electric energy source in electric communication with the driveline disconnect clutch actuator, the second electric energy source comprising a winding wrapped around a stator of an electric machine. The system includes where the electric machine is a propulsion source of a vehicle. The system further comprises a pair of diodes arranged in parallel between the winding and the driveline disconnect clutch actuator. The system further comprises an AC to DC converter arranged between the winding and the driveline disconnect clutch actuator. The system includes where the driveline disconnect clutch actuator is a DC motor. The system includes where the winding is galvanically insulated from other windings of the stator. The system further comprises an H-bridge arranged between the first electric energy source and the driveline disconnect clutch actuator.

Figure 5:
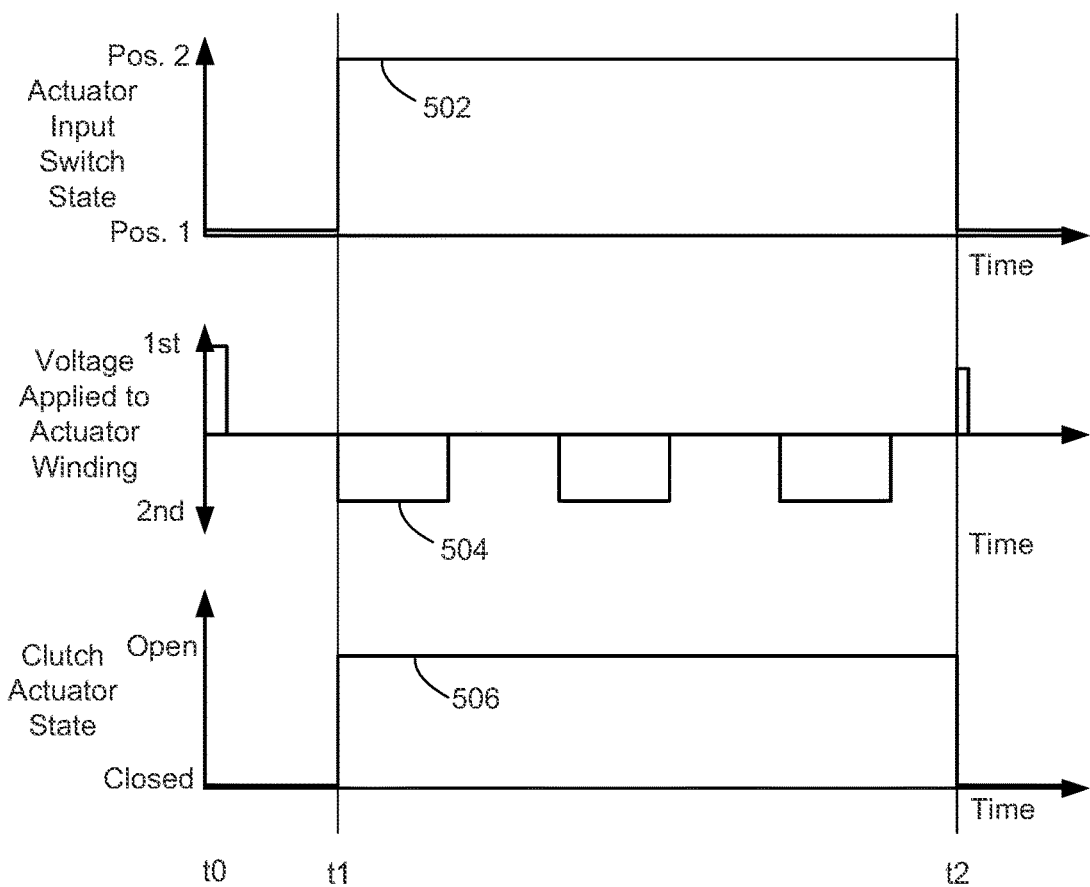
FIG. 5 is an operating sequence for a driveline disconnect clutch actuator is shown.

Referring now to FIG. 5, an example prophetic operating sequence for operating a driveline disconnect clutch actuator is shown. The sequence of FIG. 5 may be performed according to the method of FIG. 6 in cooperation with the system of FIGS. 1-3. Times of interest are indicated via vertical lines at t0-t2. The plots are aligned in time and occur at the same time.

The first plot from the top of FIG. 5 is a plot of a driveline disconnect actuator input switch state versus time. The vertical axis represents the operating state of the driveline disconnect actuator input switch (e.g., 302). The driveline disconnect actuator input switch is in a first position (e.g., output of the H-bridge is coupled to coil or winding 308 and output of winding 350 is not coupled to coil or winding 308). The driveline disconnect actuator input switch is in a second position (e.g., output of the H-bridge is not coupled to coil or winding 308 and output of winding 350 is coupled to coil or winding 308). The horizontal axis represents time and time increases from the left side of the plot to the right side of the plot. Trace 502 represents the state of the driveline disconnect actuator input switch.

The second plot from the top of FIG. 5 is a plot of voltage that is applied to the driveline disconnect clutch actuator winding or coil 303. The vertical axis represents the voltage that is applied to the disconnect clutch actuator winding or coil 303. The horizontal axis represents time and time increases from the left side of the plot to the right side of the plot. Trace 504 represents the voltage that is applied to the disconnect clutch actuator winding or coil 303. The voltage that is applied to the disconnect clutch actuator winding or coil 303 is a first polarity when trace 504 is above the horizontal axis, and the voltage that is applied to the disconnect clutch actuator winding or coil 303 is a second polarity when trace 504 is below the horizontal axis, where the second polarity is opposite of the first polarity.

The third plot from the top of FIG. 5 is a plot of a driveline disconnect clutch versus time. The vertical axis represents the operating state of the driveline disconnect clutch. The horizontal axis represents time and time increases from the left side of the plot to the right side of the plot. Trace 506 represents the state of the driveline disconnect clutch.

At time t0, the driveline disconnect clutch actuator input switch state is in the first position and the voltage that is applied to the driveline disconnect clutch actuator winding is applied with a first polarity that causes the clutch actuator to fully closed. Shortly after time t0, the H-bridge opens (not shown) and the voltage that is applied to the driveline disconnect clutch actuator is reduced to zero. The driveline disconnect clutch is in a closed position and it remains in the closed position.

At time t1, the first electric power source (not shown) becomes unavailable. Therefore, the driveline disconnect clutch actuator switch changes from the first position to the second position. The voltage that is applied to the driveline disconnect clutch actuator winding changes to the second polarity, which causes the driveline disconnect clutch to change from the closed state to the open state. Between time t1 and time t2, the voltage that is applied to the driveline disconnect clutch actuator winding is pulsed and it remains at the second polarity.

At time t2, the first electric power source (not shown) becomes available and the driveline disconnect clutch is requested to be closed (not shown). Therefore, the driveline disconnect clutch actuator switch changes from the second position to the first position. The voltage that is applied to the driveline disconnect clutch actuator winding changes to the first polarity, which causes the driveline disconnect clutch to change from the open state to the closed state.

In this way, a bi-stable driveline disconnect clutch actuator may be configured to transition to an open state in response to a power source becoming unavailable. The driveline disconnect clutch may return to a state where the driveline disconnect clutch may be opened or closed when the first power source become available.

Referring now to FIG. 6, an example method for operating a driveline disconnect clutch is shown. The method described herein may be provided via the circuit shown in FIG. 3. Alternatively, the method of FIG. 6 may be provided via the circuit shown in FIG. 4.

At 602, method 600 judges if a first power source is available. A first power source may be available when the first power source is operational and has capacity to provide electrical power to electric power consumers (e.g., a driveline disconnect clutch actuator). The first power source may be unavailable when it is deactivated due to a requested shutdown, when less than desirable electrical connections are present (e.g., open or short circuit), or when the first power source does not output an expected amount of electric power. In one example, the first power source may be determined to be available if a coil or winding of a driveline disconnect clutch actuator input switch (e.g., 302*d*) is activated. If method 600 judges that the first power source (e.g., 339 of FIGS. 3 and 4) is unavailable, the answer is yes and method 600 proceeds to 620. Otherwise, the answer is no and method 600 proceeds to 604.

At 604, method 600 optionally judges if an AC to DC converter or power electronic converter is present. In one example, method 600 may judge if an AC to DC converter is present if a controller is configured to operate the driveline disconnect actuator or if a voltage is present at a particular location or component of a circuit for operating a driveline disconnect clutch actuator. In some examples, method 600 may proceed directly to 606. If method 600 judges that an AC to DC converter or power electronic converter is present, the answer is yes and method 600 proceeds to 612. Otherwise, the answer is no and method 600 proceeds to 606.

At 606, method 600 adjusts a driveline disconnect clutch actuator input switch to a second state. In the second state, the driveline disconnect clutch actuator input switch routes a voltage at a second input of the driveline disconnect clutch actuator input switch to the output of the driveline disconnect clutch actuator input switch. The first input of the driveline disconnect clutch actuator input switch is open circuited. By routing the voltage that is applied to the second input of the driveline disconnect clutch actuator input switch to the output of the driveline disconnect clutch actuator input switch, the driveline disconnect clutch actuator may be activated via electrical power that is supplied via the third winding (e.g., 350) of the propulsion source. Method 600 proceeds to 608.

At 680, method 600 rectifies AC power that is generated via the third winding to DC via two diodes that are connected in parallel as shown in FIG. 3. Method 600 proceeds to 610.

At 610, method 600 supplies the DC power generated via the third windings and the diodes to the driveline disconnect clutch actuator. The driveline disconnect clutch actuator opens the driveline disconnect clutch. Method 600 proceeds to exit.

At 612, method 600 converts AC power that is generated via the third winding to DC via the AC to DC converter or the power electronic converter. Method 600 proceeds to 614.

At 614, method 600 supplies the DC power generated at 612 to the driveline disconnect clutch actuator. In one example, as shown in FIG. 4, the DC power is supplied to an H-bridge before it is supplied to the driveline disconnect clutch actuator. The driveline disconnect clutch is opened via power that is generated via the third winding. Method 600 proceeds to exit.

At 620, method 600 adjusts a driveline disconnect clutch actuator input switch to a first state. In the first state, the driveline disconnect clutch actuator input switch routes a voltage at a first input of the driveline disconnect clutch actuator input switch to the output of the driveline disconnect clutch actuator input switch. The second input of the driveline disconnect clutch actuator input switch is open circuited. By routing the voltage that is applied to the first input of the driveline disconnect clutch actuator input switch to the output of the driveline disconnect clutch actuator input switch, the driveline disconnect clutch actuator may be activated via the first electric power source 339. Method 600 proceeds to 622.

At 622, method 600 supplies electric power to the driveline disconnect clutch actuator via an H-bridge as shown in FIGS. 3 and 4. The H-bridge may change polarity of a voltage that is applied to the driveline disconnect clutch actuator so that the driveline disconnect clutch may be fully opened or fully closed via adjusting a polarity of a voltage that is applied to the driveline disconnect clutch actuator. Method 600 proceeds to exit.

In this way, a driveline disconnect clutch actuator may be operated via power from a first power source or a second power source. The second power source may be applied when the first power source is unavailable.

Thus, the method of FIG. 6 provides for a method for operating a driveline disconnect clutch, comprising: supplying electric energy to a driveline disconnect clutch actuator via a first power source; and supplying electric energy to the driveline disconnect clutch actuator via a second power source, where the second power source is a winding of a traction motor. The method includes where the electric energy supplied by the first power source and the electric energy supplied by the second power source flow through a switch. The method includes where the switch is a single pole double throw switch. The method includes where the winding is wound around a stator. The method further comprises rectifying the electric energy that is supplied via the second power source. The method includes where the electric energy is rectified via two diodes that are arranged in parallel. The method includes where the electric energy is rectified via an AC to DC converter. The method includes where supplying electric energy to the driveline disconnect clutch actuator via the second power source includes routing the electric energy to the driveline disconnect clutch actuator via the second power source and an H-bridge.

The method of FIG. 6 also provides for a method for operating a driveline disconnect clutch, comprising: supplying electric energy to a driveline disconnect clutch actuator via a first power source; and supplying electric energy to the driveline disconnect clutch actuator via a second power source when output of the first power source is unavailable, where the second power source is a winding of a traction motor. The method further comprises coupling the first power source to the driveline disconnect clutch actuator via a switch when the output of the first power source is available. The method further comprises coupling the second power source to the driveline disconnect clutch actuator and decoupling the first power source from the driveline disconnect clutch actuator via the switch when the output of the first power source is not available. The method further comprises rectifying an output voltage of the second power source. The method further comprises routing electric energy from the first power source to an H-bridge and routing the electric energy from the H-bridge to the driveline disconnect clutch actuator.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a driveline disconnect clutch, comprising:
    supplying electric energy to a driveline disconnect clutch actuator via a first power source; and
    supplying electric energy to the driveline disconnect clutch actuator via a second power source in response to the first power source being unavailable, where the second power source is a winding of a traction motor that is galvanically insulated from other windings of the traction motor.

2. The method of claim 1, where the electric energy supplied by the first power source and the electric energy supplied by the second power source flow through a switch, and where the other windings of the traction motor include a first winding, a second winding, and a third winding.

3. The method of claim 2, where the switch is a single pole double throw switch.

4. The method of claim 1, where the winding is wound around a stator.

5. The method of claim 1, further comprising rectifying the electric energy that is supplied via the second power source.

6. The method of claim 5, where the electric energy is rectified via two diodes that are arranged in parallel with each other.

7. The method of claim 5, where the electric energy is rectified via an AC to DC converter.

8. The method of claim 7, where supplying electric energy to the driveline disconnect clutch actuator via the second power source includes routing the electric energy to the driveline disconnect clutch actuator via the second power source and an H-bridge.

9. A system for operating a driveline disconnect clutch, comprising:
    a first electric energy source in electric communication with a driveline disconnect clutch actuator; and
    a second electric energy source in electric communication with the driveline disconnect clutch actuator, the second electric energy source comprising a first winding, a second winding, a third winding, and a fourth winding wrapped around a stator of an electric machine.

10. The system of claim 9, where the electric machine is a propulsion source of a vehicle.

11. The system of claim 10, further comprising a pair of diodes arranged in parallel with each other between the fourth winding and the driveline disconnect clutch actuator.

12. The system of claim 10, further comprising an AC to DC converter arranged between the fourth winding and the driveline disconnect clutch actuator.

13. The system of claim 9, where the driveline disconnect clutch actuator is a DC motor.

14. The system of claim 9, where the fourth winding is galvanically insulated from other windings of the stator.

15. The system of claim 9, further comprising an H-bridge arranged between the first electric energy source and the driveline disconnect clutch actuator.

16. A method for operating a driveline disconnect clutch, comprising:
    supplying electric energy to a driveline disconnect clutch actuator via a first power source; and
    supplying electric energy to the driveline disconnect clutch actuator via a second power source when output of the first power source is unavailable, where the second power source is a winding of a traction motor.

17. The method of claim 16, further comprising coupling the first power source to the driveline disconnect clutch actuator via a switch when the output of the first power source is available.

18. The method of claim 17, further comprising coupling the second power source to the driveline disconnect clutch actuator and decoupling the first power source from the driveline disconnect clutch actuator via the switch when the output of the first power source is not available.

19. The method of claim 16, further comprising rectifying an output voltage of the second power source.

20. The method of claim 16, further comprising routing electric energy from the first power source to an H-bridge and routing the electric energy from the H-bridge to the driveline disconnect clutch actuator.

* * * * *